Oct. 2, 1934.   T. J. KROUSE   1,975,513
ALARM SYSTEM
Filed Feb. 13, 1931
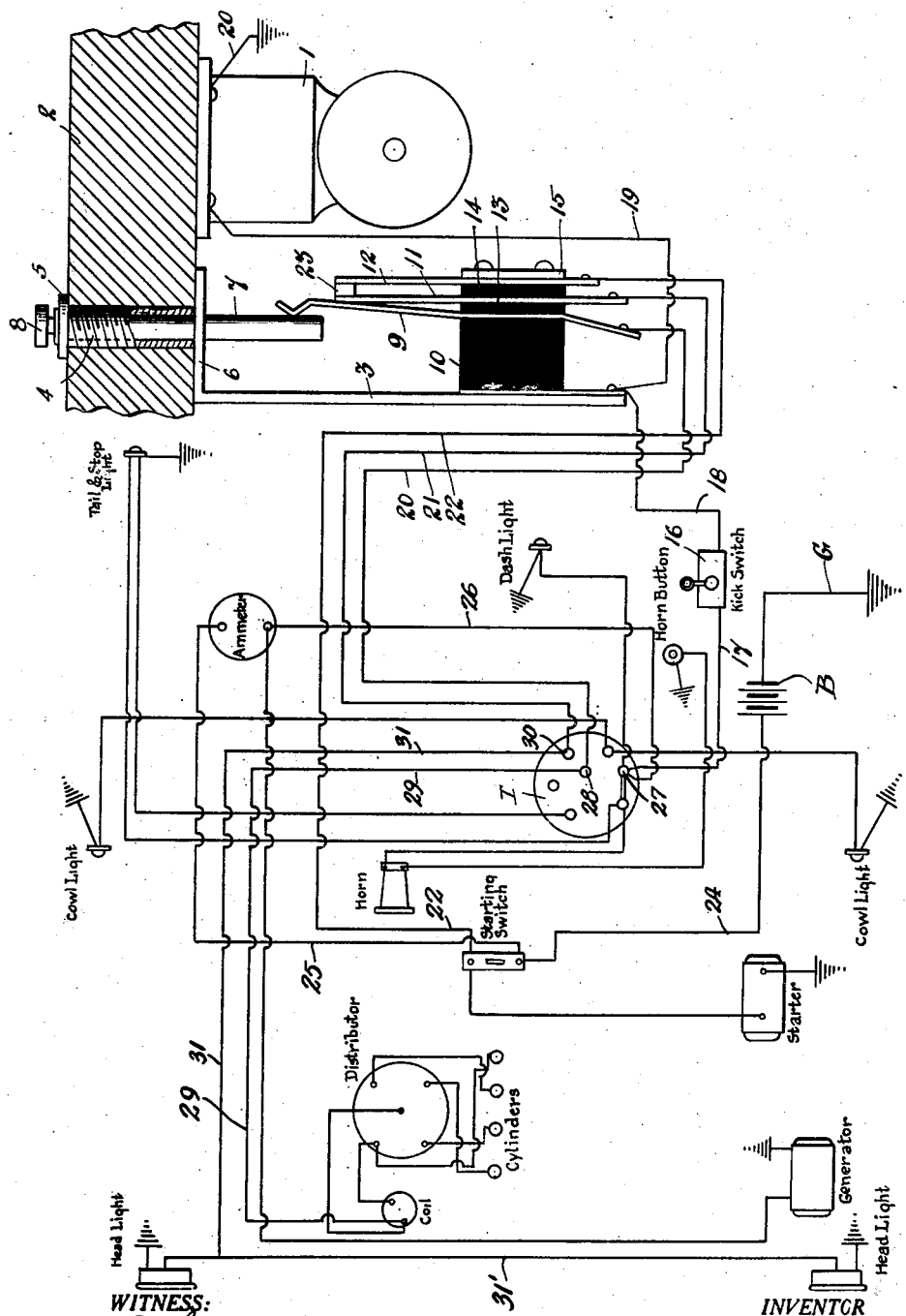
INVENTOR
Thomas J. Krouse Patented Oct. 2, 1934

1,975,513

UNITED STATES PATENT OFFICE 1,975,513

ALARM SYSTEM

Thomas J. Krouse, Philadelphia, Pa.

Application February 13, 1931, Serial No. 515,497

2 Claims. (Cl. 177—314)

This invention relates to alarm systems, and has for an object to provide a system especially adapted for association with an automotive vehicle embodying an electrical system, which said organization shall provide means for sounding an alarm in case of unauthorized tampering with the electrical system of the vehicle.

It is well known that automotive vehicles are regularly provided with electrical systems which control the starting and operation of the motor as well as other instrumentalities such as a horn, lights and the like. The present invention is directed to an organization which is so associated with the electrical system that any unauthorized tampering, whether it shall be in the line of starting the motor, or merely turning on lights or sounding the horn, will sound the alarm signal so that the tampering person may be deterred from further tampering and the owner or others advised of such act.

The invention comprises an alarm unit of any approved type, and with a switch having a removable member which closes the circuit, such circuit or circuits closed by the removable member connecting with all, or substantially all of the electrical organization of the vehicle so that in case any of the electrical accessories are tampered with, the alarm will be sounded to give the warning referred to.

The invention further includes means whereby the operator of the vehicle, irrespective of the position of the removable member of the switch, may sound an alarm, as for instance, in case of an attempted hold-up, the operator may connect the alarm in circuit to continually sound and thereby issue an appeal for assistance as well as deterring the miscreants from any other felonious attempt.

The invention is directed to other objects and possesses other features of novelty and advantage, some of which, together with the foregoing, will be hereinafter more fully set forth.

The drawing is a view in side elevation of the switch with the removable member showing conventionally an alarm unit, and in diagram, a conventional wiring system of an automotive vehicle and the connection through the switch with the alarm.

The present invention provides for an alarm unit 1 which may be of any approved or desired type. In the drawing, the alarm unit is indicated as an electric bell, but it is to be understood, that this is purely conventional and that the alarm may be in fact, any type of electrically operated alarm. Preferably, the alarm is connected at the rear of the dash 2. The position of the alarm, however, is optional, and it may be placed anywhere that fancy or good judgment may dictate.

Connected with the dash 2 is a switch having a bracket 3 which is connected directly to the dash. This connection may be by any mechanical means found feasible, but in the drawing it is shown as provided with a threaded sleeve 4 with a nut 5 thereon, which in association with the arm 6 will clamp the device upon the dash.

The sleeve 4 also provides a guide way for the key 7. This key 7 is provided with a head 8, preferably of an ornamental nature, which will be the only part of the organization to appear upon the observable side of the dash 2. The key 7 is manipulated manually by the head 8 and is withdrawn and inserted thereby.

The bracket 3 carries a spring switch member 9 secured to the bracket by the interposition of an insulating block 10. Other contacts 11 and 12 are spaced from the spring contact 9 by other insulating blocks 13 and 14, and all secured by means of an insulating clip 15.

The usual battery B, ordinarily employed upon a motor vehicle, is utilized in the present installation, and the current for operating taken from various points in the various circuits energized from such battery B.

An examination of the diagram will show exactly these connections, and any one, or in fact all, are unimportant so far as the present invention is concerned, except in combination with the type of switch employed therewith. There is, however, a switch 16 of a single throw type connected through the wires 17 and 18, from a live connection directly to the bracket 3. From the bracket 3, a conductor 19 extends to the alarm unit 1 which is grounded at 20, the battery B being grounded at G as usual. When the switch 16 is closed, therefore, there is current flowing through the circuits, including the conductors 17 and 18 to the bracket 3, and through the conductor 19 to the alarm unit 1. This switch 16 is designated as a kick switch, it being intended to locate this switch convenient to the foot of the operator so that in an emergency of any kind, the operator may by a minimum movement, throw the switch 16 to close the circuit and thereby, initiate and continue the sounding of the alarm unit 1. The switch 16 is an ordinary type of switch which when thrown to closed position, retains that position until released.

The electrical installation as shown in the drawing is purely diagrammatic and for illustration only. No attempt has been made to follow any structural details, but it is believed that all of such diagrammatic devices as shown are within the knowledge of one skilled in the electrical art and fully understandable.

As diagrammed, energy from the battery B will pass through the wire 24 to the starting switch through the wire 25 to the ammeter and through the wire 26 to the contact 27 on the support I.

This support I is shown as a circle, but is intended to include all of the usual structure usually found in that organization known as "the ignition" and includes switches or a master switch for controlling various circuits. For instance, bridging from the contact 27 to the contact 28 will energize the wire 29 to the coil, and simultaneously the wire 20 to the spring member 9.

Bridging to the contact 30 will energize the wire 31 and its branch 31' to the headlights, and simultaneously energize the wire 21 to the contact member 11.

When energy from the battery B through the wire 24 is transmitted to the wire 22, by the closing of the starter switch, said wire 22 will energize the spring switch 12.

When the key 7 is in position, as shown in the drawing, all of these spring switches 9, 11 and 12 are in contact and, therefore, in contact with the bracket 3, which serves not only as a bracket for supporting the switch members, but also as a conductor to which is attached the wire 19 to the bell 1 and also the wire 18 to the kick switch which is supplied through the line 17 from the contact 27.

When the key 7 is in position, as shown in the drawing, the spring switch contact 9 is forced into engagement with the switch member 11, and through the block 23, also in electrical connection with the member 12. The switch key 7 is in electrical contact with the bracket 3 so that current will flow through any of the circuits represented by the conductors 20, 21 and 22, and the switch members 9, 11 and 12 respectively, through the key 7 and bracket 3 to the conductor 9, and alarm unit 1. Each of the several electrical instrumentalities of the system disclosed in diagram are connected with one of the conductors 20, 21 or 22 so that closing the circuits of the elected electrical installation of the vehicle will also close a circuit to the alarm unit 1 as described.

Of course, the alarm organization, herein illustrated, may be modified in various ways without departing from the invention herein set forth and hereinafter claimed.

The invention is hereby claimed as follows:

1. The combination with a vehicle embodying a starter circuit, a light circuit, a coil circuit, a source of electrical energy included in all of said circuits, some parts of some of said circuits forming parts of others of said circuits, said circuits each being open at two points, spring contact members in said circuits, a removable conducting member cooperating with the spring contact members to close all of said circuits at one open point of each, means to close said circuits individually at the other of said open points, and an alarm in circuit with all of said circuits when said removable conducting member is in circuit closing position.

2. The combination with a vehicle embodying a starter circuit, a light circuit, a coil circuit, a source of electrical energy included in all of said circuits, some parts of some of said circuits forming parts of others of said circuits, said circuits each being open at two points, spring contact members in said circuits, a removable conducting member simultaneously cooperating with the spring contact members to close all of said circuits at one point of each, means to close said circuits individually at the other of said open points, and an alarm in circuit with all of said circuits when said removable conducting member is in circuit closing position.

THOMAS J. KROUSE.